Nov. 21, 1950     A. C. AVRIL     2,530,501
APPARATUS FOR PROPORTIONING AND MIXING MATERIALS
Filed March 20, 1947     3 Sheets-Sheet 2

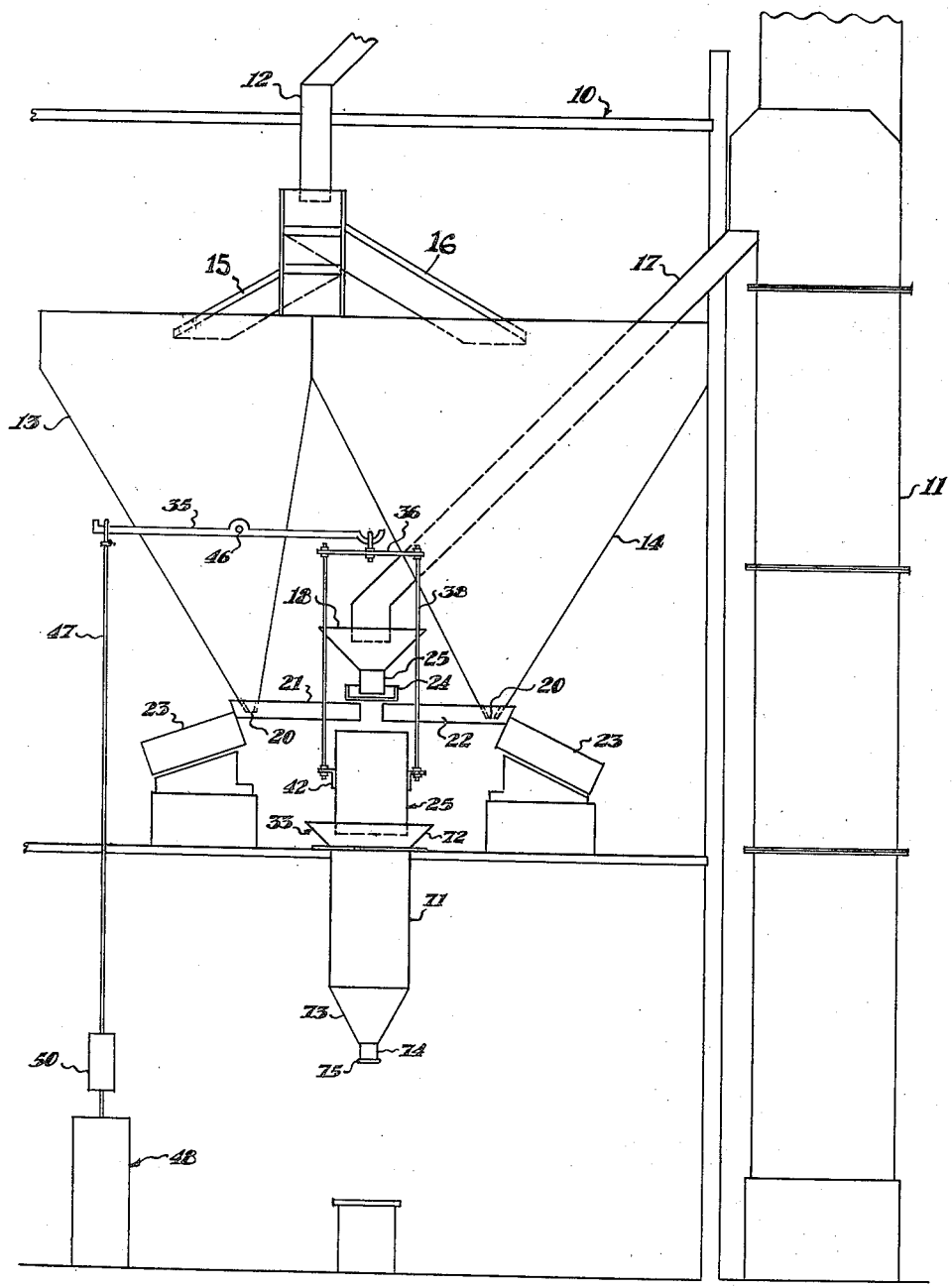

INVENTOR.
Arthur C. Avril
BY
Wood, Arey, Herron & Evans
ATTORNEYS

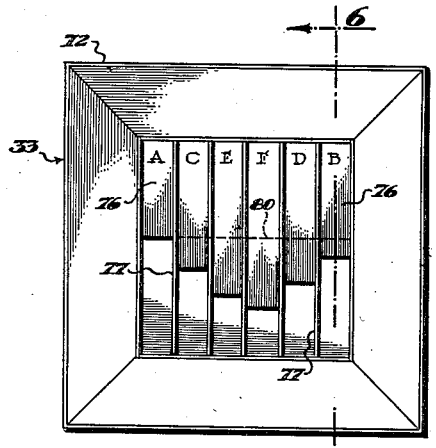
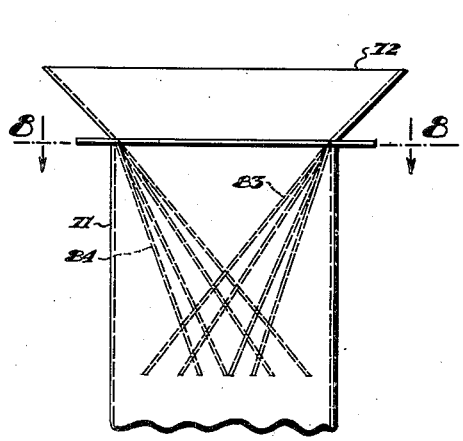
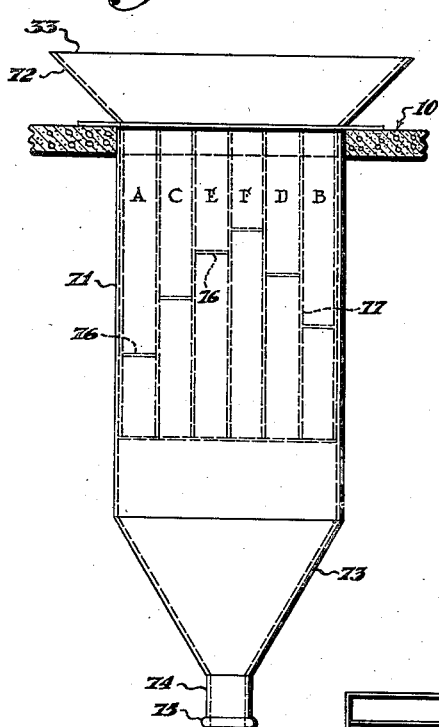
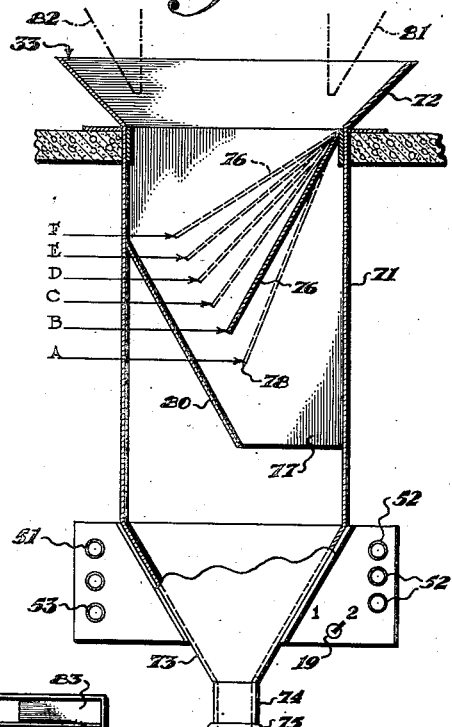
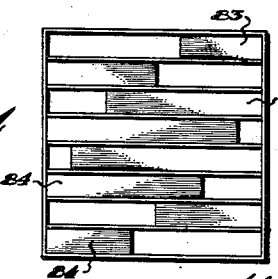

Patented Nov. 21, 1950

2,530,501

UNITED STATES PATENT OFFICE 2,530,501

APPARATUS FOR PROPORTIONING AND MIXING MATERIALS

Arthur C. Avril, Cincinnati, Ohio

Application March 20, 1947, Serial No. 735,902

4 Claims. (Cl. 259—150)

This invention relates to an apparatus for mixing and packaging uniformly measured quantities of separate bulk materials and more specifically is directed to an improved apparatus for weighing quantities of ingredients for individual batches of a dry concrete or cement mixture and thoroughly mixing each batch individually, immediately before packaging.

The apparatus is designed especially to feed and weigh, in predetermined proportions, quantities of fine aggregates, coarse aggregates, and cement in thoroughly dried condition. The several ingredients are then discharged simultaneously from a pair of opposed weighing hoppers into a combined mixing and discharge hopper which thoroughly intermingles the charges of ingredients and discharges the mixture into a sack or the like for packaging.

The batches are handled in this manner to insure uniformity in the proportions and quantity of each batch and to insure that each batch is thoroughly mixed. If instead, the ingredients were mixed in bulk quantities and withdrawn from the bottom of a hopper in small quantities for individual packaging, a great deal of segregation would occur. Due to the peculiar characteristics of the material, the coarse aggregates would separate out of the mixture and discharge in advance of the finer aggregates and cement. Thus, the uniformity of the mixture would vary for each package. In other words, those packages first withdrawn would be deficient in cement and those withdrawn later would be too rich in cement. Bearing in mind that the proportions of ingredients of a concrete mix must be held within fairly close limits, it will be apparent that the resulting product would practically be worthless.

The improved structure has particular application to the apparatus disclosed in the prior patent to Arthur C. Avril of November 14, 1939, No. 2,179,485, to which attention is invited.

The present organization embodies an improved feeding, weighing, and discharge mechanism, and an improved mixing and discharge hopper which thoroughly commingles the constituents when they are discharged for packaging. The coarse and fine aggregates are weighed separately in a common scale or weighing hopper and the cement is weighed in an independent but similar hopper. These hoppers are disposed above a mixing and discharge hopper at opposite sides thereof and are arranged to be dumped simultaneously for passage of the materials therethrough, directly into a container in a thoroughly mixed condition.

The mixing and discharge hopper is provided with a series of differentially inclined flights arranged to divide the charge of coarse and fine aggregates into a series of streams. Each stream therefore has a differential rate of flow and the respective streams collectively discharge substantially at right angles against a common cement flow baffle progressively to intermingle with and sweep the stream of cement from the cement baffle. The individual uniformly mixed streams and cement at this point intermingle and drop by gravity into a bag or container.

The measured quantity of fine aggregate is fed into the scale hopper in advance of the coarse aggregates so that the fine aggregate discharges from the scale hopper in advance of the coarse. When the two scale hoppers are discharged simultaneously, the aggregate hopper discharges its load onto the variable pitched or inclined flights. At the same time, the cement scale hopper discharges the cement onto the constant pitch cement baffle. The dry aggregates flow according to their natural tendencies, and it has been found that the earlier discharged fine particles tend to move more slowly down each flight than the later discharged coarse particles. The length of flights has been predetermined to cause the faster flowing coarse aggregates of each stream to overrun the finer particles so that the fine and coarse particles have a tendency to reach the edge of the flights in proper proportions. This mixture of aggregates then impinges against the cement baffle causing the aggregate to blend with the cement and drop by gravity into the bag or container.

In other words, the apparatus has been designed to utilize the tendency of the coarse and fine aggregate materials to segregate by reversing the segregation process. By charging the scale hopper first with the fine aggregate and then with the coarse aggregate, the batch is in a segregated condition. In flowing down the respective variably pitched flights, it is believed that the coarse aggregates, due to their faster rate of flow, tend to catch up with and reach the end of the flights at about the same moment as the finer particles. Upon striking the cement baffle the differential rate of flow of the particles is halted. If the intermingling of the coarse and fine aggregates were not halted, experiment indicates that the coarse aggregates would eventually become completely segregated from the fine aggregates and cement. In this case the coarse aggregates would tend to drop first, then the finer aggregates, and lastly the still finer particles of cement.

Briefly stated, it is the concept of the inventor to provide a mixing apparatus by means of which a charge of cement and a charge of segregated coarse and fine aggregate is discharged, the charge being separated into a series of streams each flowing at a differential speed, and the coarse and fine particles of each stream caused to intermingle, the several streams combining with each other and with the charge of cement, to be discharged into a bag or container in thoroughly mixed condition.

It has been a principal object of the inventor to provide an apparatus for the uniform packaging of a dry concrete mixture which produces uniform packages of accurately measured and thoroughly mixed ingredients, as a continuous production operation and by automatic control of the apparatus.

It has been a further object to provide an apparatus for accurately measuring, by weight, the ingredients for a dry concrete mix by means of scale hoppers, one of which is arranged to measure a predetermined amount of cement and the second of which is arranged to weigh separately a predetermined amount of fine and a predetermined amount of coarse aggregate into the same scale hopper, the feed of the materials into the hopper being controlled automatically by operation of scale beams upon which the hoppers are mounted.

It is a further object of the inventor to provide an improved mixing hopper and a pair of weighing hoppers disposed at opposite sides of the mixing hopper, the weighing hoppers arranged for simultaneous discharge into the mixing hopper and the mixing hopper having flights arranged to cause the aggregate flow to be adjusted to and correlated with the gravity flow of cement, whereby the cement and aggregate is thoroughly mixed and which causes a positive feed and intermingling of the cement relative to the aggregate, prior to discharge into a storage bag.

It has been another object of the inventor to provide an apparatus incorporating a mixing hopper having separate compartments which are sloped at varying angles on the aggregate side, to cause the aggregate to flow at varying speeds and to divide the aggregate into comparatively small thoroughly mixed units which tend to discharge in sequence to reduce to a minimum, the impact of the mass of material.

Various other objects and advantages of the invention will be more fully set forth in the specification with reference to the accompanying drawings in which:

Figure 1 is a general diagrammatic view of a complete dry concrete mixing plant embodying the present improvements.

Figure 4 is a side elevation of the improved mixing and discharge hopper.

Figure 5 is a top plan view of the same.

Figure 6 is a vertical sectional view of the hopper taken on line 6—6, Figure 5.

Figure 7 is a fragmentary view similar to Figure 6 showing the mixing baffles arranged in a somewhat modified fashion.

Figure 8 is a sectional view taken on line 8—8, Figure 7.

Figure 3:
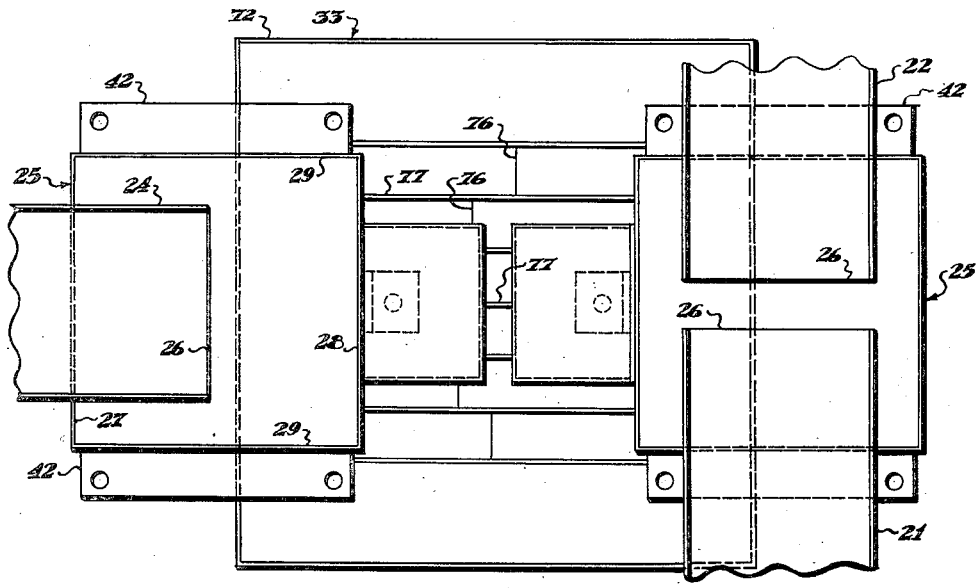
Figure 3 is a fragmentary top plan view projected from Figure 2, further illustrating the improved scale hoppers relative to the mixing hopper.

In the preferred embodiment of the invention the dry aggregate is fed to a series of screens which separate and grade the mixture according to size. Feed chutes preferably of the vibrating type distribute the graded mixture to four separate storage bins. The apparatus is controlled automatically by an electric control circuit whereby the sand and gravel aggregates are fed from the storage compartments to an aggregate weighing hopper whereby a predetermined proportion of fine aggregate such as sand first is fed to the weighing hopper followed by a predetermined proportion of coarse aggregate such as gravel. The aggregate weighing hopper is carried upon a scale beam which automatically controls the feed of coarse and fine aggregates into the same hopper. During this operation a second weighing hopper is loaded with a charge of cement proportioned according to the sand and aggregate mixture. When both scale hoppers are properly charged, the operator discharges the scale hoppers by operating a push button which causes both hoppers to discharge simultaneously into the mixing hopper to intermingle the constituents.

Referring to Figure 1, showing a preferred embodiment of the invention, the framework of a structure upon which the apparatus is mounted is indicated generally at 10. In general, the organization incorporates a cement elevator 11 and means (not shown) for drying, conveying and elevating a mixture of sand and coarse aggregates. This dry mixture is conveyed by a spout indicated at 12 which discharges upon suitably arranged grading screens which are arranged to separate the aggregates into four grades. The graded material then drops by gravity through the screens and is conveyed to the storage hoppers by means of gravity chutes or vibrating feeders of an approved design. The apparatus preferably embodies four storage bins, one each for fine and coarse sand and one each for fine and coarse aggregates.

The storage hoppers are served by individual feeders. In the present instance the apparatus is provided with a pair of storage hoppers 13 and 14, each of which is of dual construction. This provides four compartments. Thus, the hopper 13 is arranged for the storage of fine and coarse sand and the hopper 14 for the storage of fine and coarse aggregates. Hoppers 13 and 14 are served by separate supply chutes indicated respectively at 15 and 16.

Since the specific construction of the grading and storage apparatus does not form an essential part of the present invention, a detailed description of the structure is omitted. It will be apparent, however, that the mixture of coarse and fine sand and coarse and fine aggregates as discharged from the spout 12 is subdivided into four sizes and discharged into individual storage bins. Thus, a predetermined amount of coarse and fine sand and coarse and fine aggregates may be individually metered from the storage bins into a common scale or weighing hopper prior to discharge into the mixing hopper for mixing and packaging.

The cement elevator 11 is provided with a discharge spout or nozzle 17 by means of which bulk cement is discharged by gravity into a cement hopper 18. Cement hopper 18, similar to the sand and aggregate hoppers, is provided with a scale hopper into which the cement is fed.

As shown in Figure 1, the sand and aggregate storage hoppers 13 and 14 are cone-shaped and each includes a pair of openings 20. These openings are disposed above suitable vibratory feeders 21 and 22 of any approved design which are actuated by means of vibrating units 23.

The cement hopper 18 likewise includes a vibratory feeder 24 actuated by a vibrator unit (not shown). For this purpose, the hopper 18 includes a spout 25 opening into the feeder 24 and the feeder extends to a cement scale hopper similar in construction to the scale hopper of the sand and aggregate feeders.

As previously noted the aggregates preferably are divided into coarse and fine aggregates and coarse and fine sand. In other words the coarse aggregates may consist of large and small gravel while the fine aggregates may consist of coarse and fine sand. For this purpose the sand storage hopper or bin 13 is divided by a partition segregating the fine from the coarse sand, and hopper 14 similarly includes a partition segregating the fine from the coarse aggregates. In order to supply a predetermined proportion of fine and coarse sand and fine and coarse aggregates, the discharge opening for the respective compartments is adjustable, for example by means of sliding doors.

As indicated diagrammatically in Figure 3 the discharge opening for the mixture of fine and coarse sand communicates in common with the sand feeder 21 while the fine and coarse aggregate discharge opening likewise communicates in common with an aggregate feeder 2. By adjusting the size of the fine and coarse respective openings 20 relative to each other a predetermined charge of the coarse and fine sand may be conveyed to the scale hopper and likewise a predetermined charge of coarse and fine sand.

The control apparatus for the system incorporates a selector switch indicated at 19 by means of which the operation of the sand and aggregate feeders may be regulated to produce either a concrete mix or alternately a mixture of sand and cement for cement work. By operation of the selector switch in the position for concrete both feeders 21 and 22 are caused to be energized while in the position for cement the coarse aggregate feeder is inoperative.

Figure 2:
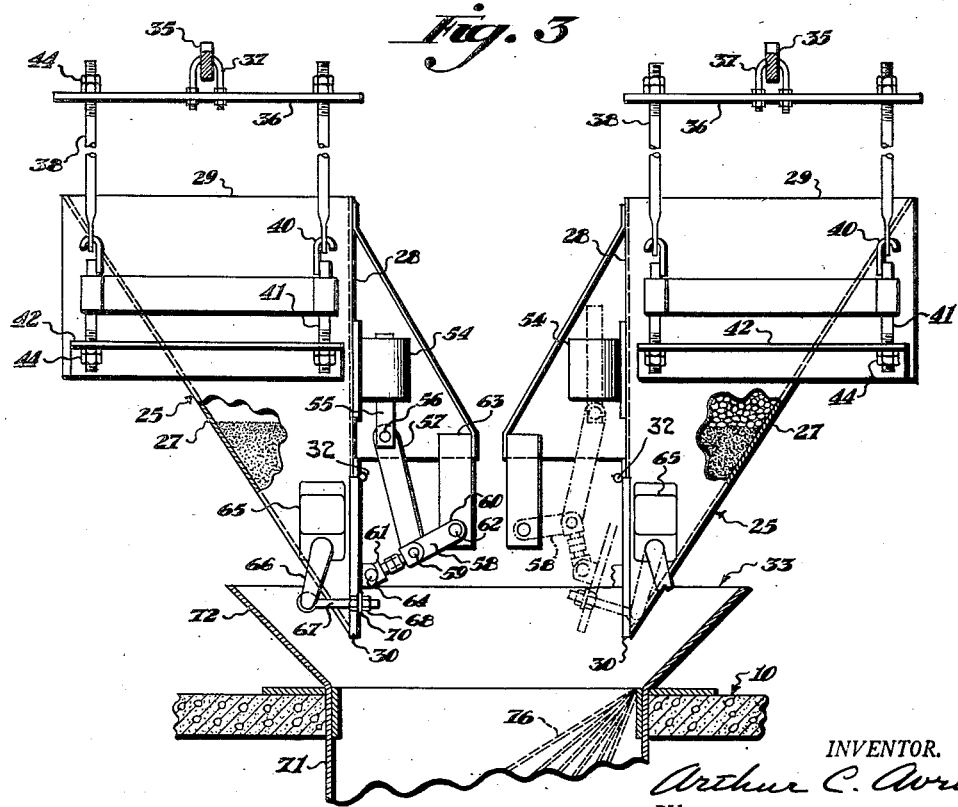
Figure 2 is a fragmentary side elevation, partially in section, illustrating the scale hoppers with relation to the upper portion of the mixing hopper.

As viewed from the side, as shown in Figure 2, each scale hopper assembly constitutes a triangular-shaped hopper unit 25 formed preferably of sheet metal of welded construction. The sand and aggregate and cement scale hoppers are of identical construction, therefore the description which is confined to one of them, applies to both. Each scale hopper has an open top and the material drops by gravity over the ends 26 of the vibratory feeders, disposed above the hopper. The hopper includes an inclined rear panel 27 and a vertical front panel 28 and respective triangular-shaped side panels 29—29. The inclined panels 27 facilitates the feeding by gravity of the materials from the lower end of the hopper. For this purpose the hopper is provided with a discharge door 30 which is located at the lower end of the vertical panel 28, the door being hingedly mounted as at 32 to panel 28. The door normally closes a discharge opening formed in panel 28 which extends for the approximate height of the door. When it is opened the contents of the hopper 25 are discharged into the mixing and discharge hopper, indicated generally at 33.

Each respective scale hopper 25 is suspended in position above the mixing chute or hopper 33 from respective beams or levers 35. These levers are interconnected with an electrically operated control apparatus which regulates the operation of the vibratory feeders 21 and 22 as hereinafter noted. Therefore, when the predetermined mass of material is fed to the hopper, the control apparatus operates to deenergize and stop the vibratory feeders automatically.

Described in detail, each hopper is suspended from an equalizer plate 36 which is centrally attached to the scale beam 35 by means of a U-bolt 37. Plate 36 is provided with hanger rods 38 preferably four in number, depending downwardly from the plate and having their lower ends attached to hooks 40. These hooks are welded or otherwise secured to respective hanger bolts 41 arranged in pairs on opposite sides of the hopper. The lower end of each bolt 41 is engaged through the opposite ends of an angle iron 42 secured to the respective opposite side panels 29 of the scale hopper.

In order to provide for adjusting the angle of suspension of the scale hopper and its elevation relative to the mixing hopper 33, the hanger bolts 41 have their lower ends screw-threaded and each includes a pair of adjustment nuts 44. Each hanger rod 38 likewise is provided with a pair of nuts 44 at its upper end. Adjustment of these nuts regulates the scale hopper vertically and angularly relative to the mixing hopper 33. It will be apparent, that the respective scale hoppers are suspended by U-bolts 37 from a central point in a balanced condition above the common mixing hopper 33.

As shown in Figure 1, illustrating diagrammatically a typical scale hopper suspension system, the scale beam 35 is pivotally mounted at its center as at 46. This fulcrum 46 may follow any approved design such as an anti-friction bearing or a knife edge arrangement. The opposite end of the scale beam is connected to a vertical cable or rod 47 which extends downwardly to the control system indicated generally at 48. Connector element 47 may be provided with a suitable counterweight 50 to counterbalance the scale hopper, or the control apparatus 48 may incorporate a suitable counterbalance mechanism. When a sufficient weight of material is fed into the hopper, the hopper overbalances the counterweight 50 and moves downwardly a sufficient distance to actuate the control apparatus 48 through scale beam 35 and connecting element 47. Thus, the operation of the vibrating feed members 21 and 22 is interrupted automatically when the predetermined quantity is fed into the hopper.

The electrical control operation for regulating automatically the feeding of the materials into the scale hoppers may follow any preferred design. For example, it may follow somewhat the circuit illustrated in the prior Avril patent. The specific control system does not form an essential part of the present apparatus, therefore a brief generalized description of the function of the control system is believed to be sufficient.

The vibrating units 23 which actuate the respective vibratory feeders 21, 22 and 24 are energized independently by means of the electrical control circuit. This control circuit is inter-connected with and forms a part of the control system 48 which is actuated by the scale beams 35. Each of the several scale hoppers is suspended independently by means of individual scale beams 35 connected to the control system 48 in the manner illustrated in Figure 1. The operating cycle of the apparatus is initiated preferably by manual operation of a start button indicated at 51 (see Figure 6). This causes operation of the several vibratory feeders 21, 22 and 24 to feed the respective materials into the scale hoppers. When a given scale hopper is fully charged, it over-balances its counterweight 50 which, by virtue of the control system 48, deenergizes the vibrator unit 23. This operation is independent for each of the feeders 21, 22 and 24 and each continues until its particular scale hopper is properly charged, at which time the signal lamp 52 for the particular hopper flashes on to indicate that it is charged. When all of the hoppers are charged, the manual dump button 53 may be depressed to open both discharge doors 30 and dump the contents of the hoppers into the mixing hopper 33 simultaneously.

For this purpose each hopper is provided with an electrically operated door actuating mechanism by means of which the doors are opened at the same time. Each hopper is provided with a solenoid unit 54 having slidably disclosed therein a solenoid plunger 55. The lower end of the plunger is pivotally connected as at 56 to a connecting link 57 which extends to a toggle assembly 58. Link 57 makes a pivotal connection with toggle 58 by means of a pivot pin 59.

Toggle unit 58 essentially comprises a pair of levers 60 and 61 having their inner ends joined in common to the pivot pin 59. The opposite end of lever 60 is pivotally connected as at 62 to a fixed support bracket 63 secured to the scale hopper. The outer end of the lever 61 is connected as at 64 to the discharge door 30. Lever 61 is preferably in the form of a turnbuckle so as to permit its length to be adjusted and thereby to properly position the door 30 with respect to its opening.

When solenoid 54 is energized by operation of push button 53 as shown in Figure 2, a scissors effect is developed between the levers of toggle 58 thereby causing the discharge door 30 to be opened as indicated in broken lines. It will be apparent that in normal or closed position the toggle 58 is self-locking. In other words, in closed position the pivot points 59, 62 and 64 are in alignment thereby establishing a dead center lock for the door. This prevents the weight of the load from forcing the door open and insures that the material is retained in the hoppers until the solenoids 54 are energized.

As shown in Figure 2, the operating mechanism of each door is provided with a limit switch 65. This switch includes an arm 66 having at its lower end a pivotally mounted link 67. The opposite end of link 67 is secured to the door by means of nuts 68 loosely engaging a lug 70 welded or otherwise secured to the door 30. The switches 65 are arranged in the control circuit to serve as electrical interlocks for the solenoids 54. When the solenoid is energized to open the door, arm 66 swings with the door to actuate switch 65 and establish a circuit to prevent starting of the feeders 21 and 22 until both doors are again closed. This also prevents start of the feed cycle if one of the doors is not completely closed, for example should a pebble be caught under the door. In each instance the discharge opening and door extend across the full width of the hopper to distribute the contents of both hoppers across the full width of the mixing hopper.

Described in detail, the mixing chamber or hopper 33 preferably is formed from sheet metal of welded construction. In general, it incorporates an elongated body 71 having a flared intake chute 72 at its upper end and a funnel-shaped discharge chute 73 at its lower end. The discharge funnel 73 terminates in a flexible spout 74 having a bead 75 at its lower edge. The spout 74 is designed to receive the open end of a sack or bag for packaging the mixed ingredients as the ingredients drop through the mixing hopper. As disclosed in the prior patent, the material is bagged immediately upon discharge and the bags are closed preferably by an automatic sewing or stitching machine which is appropriately located at the discharge zone.

As shown, the hopper is provided with a series of baffles or flights 76, in the present instance six in number. The respective flights are separated from each other by a series of separators 77 disposed between each respective flight thus providing a series of chutes. As viewed in Figure 6, each separator 77 extends downwardly from the top of the mixing hopper so that the material discharged into the chute 72 is divided by the respective separators into independent streams. In order to provide a differential rate of flow each of the six flights 76 is disposed at a different angle or slope relative to the others. For convenience in identification, the respective chutes are designated A to F inclusive in Figure 5. These are correlated with Figure 6 by the use of identical reference letters to illustrate the differential slope of each chute.

It will be apparent, therefore, that the respective separators or walls 77 combined with the respective flights 76 provide a series of individual chutes each having a different discharge angle. Consequently the discharge of coarse and fine aggregates from the scale hopper is divided into a number of streams each having a different rate of flow. It will be noted in Figure 6 that the discharge ends of the several flights 76 terminates as at 78 adjacent a deflector plate 80 disposed at an angle intersecting the angle of the flights 76. Deflector plate 80 extends for the full width across the body 71 of the hopper and each of the separators 76 extends to and is welded or otherwise joined to the baffle 80. The edges of the separators 77 are cut at an angle corresponding to the angle of baffle 80 and are joined to the face of the baffle preferably by welding. The opposite vertical edge of each plate is joined to the chamber or body 71 of the hopper. The edges 78 of flights 76 are spaced away from plate 80 sufficiently to provide a space 79 for the flow of material.

As shown in Figure 6, the discharge end of the aggregate scale hopper, indicated at 81, is located to the right-hand side of the mixing hopper and the cement scale hopper indicated at 82 is located on the left-hand side. This arrangement causes the aggregate charge to enter the several flights 76, the mixture being subdivided into a series of individual streams by the separators 77.

It has been found that the differential angles of the flights, the division of the aggregate charge into a series of streams, the length of the flights in combination with the intersecting deflector plate 80 causes a more thorough and uniform intermingling of the several ingredients of the concrete mix. Experiment indicates that this result flows from the peculiar flow characteristics of the individual ingredients in combination with the arrangement of the flights and the deflector.

Since the fine aggregates such as sand are charged first into the scale hopper with the coarse aggregates on top, as previously pointed out, the coarse and fine materials are in a segregated condition. When the discharge door is opened, the fine aggregate is discharged first. The coarse aggregates, due to their faster rate of flow, tend to overrun the finer particles. The overrunning coarse particles catch up with the finer particles approximately at the time that the mixture flows over the edge of the flights. The differential rate of flow of the particles is altered when the streams are intercepted by the cement deflector plate. Therefore each stream is independently mixed as a unit and the several streams intermixed collectively as the streams intermingle with the cement flowing down the baffle plate 80. This completes the mixture which thereupon drops into the bag for packaging.

By virtue of the relatively different flow rates of the streams of aggregates, the streams from the more sharply pitched flights strike baffle 80 in advance of the streams from the flights having a lesser degree of pitch. Therefore the effect is to cause a somewhat distributed impact as distinguished from the concentrated impact which would be developed should the entire mass strike the baffle simultaneously.

It has been found, due to the minuteness of the particles, that the cement has an angle of repose which is considerably steeper than that of the aggregates. In other words the dry cement tends to pile up rather than to flow smoothly down the inclined deflector 80. By causing the flow of cement to intersect with the flow of aggregates, the aggregates sweep the cement cleanly from the deflector 80. Therefore during each discharge the entire charge of cement is swept by the aggregates from the deflector to insure a uniform quantity of cement in each batch.

As shown in Figures 7 and 8, the modified form of mixing hopper illustrated incorporates a series of flights 83 and 84 on opposite sides of the hopper. These are subdivided by separators similar to the previously described separators 77 and converge toward each other. In this instance the deflector plate 80 is omitted and instead, the deflector plates 84 are substituted on the cement discharge side of the mixing hopper. The flow of both the cement and of the aggregates is thus divided into individual streams which are caused to intermingle upon leaving the respective flights 83 and 84. The spaces between the respective flights 83 and 84 are open and thereby permit a certain proportion of the mixture to drop directly through the hopper. In reaching the lower end of the hopper, which embodies a funnel shaped chute 73 as previously described, the several ingredients are caused to be recombined in a thoroughly mixed condition for discharge into the bag.

Having described my invention, I claim:

1. An apparatus for proportioning and mixing materials comprising; a plurality of scale beams, a respective scale hopper suspended from each of said beams, a feeding device for each of said hoppers, respective power means for actuating said feeding devices, a control system interconnecting said power means with said scale beams to control the quantity of the ingredient charged into said hoppers, a mixing hopper disposed beneath said scale hoppers, said mixing hopper having baffles adapted to intermingle said ingredients, each of said scale hoppers having a discharge door, and means for opening said discharge doors simultaneously so as to discharge the contents of said hoppers together into the mixing hopper.

2. An apparatus for weighing individual quantities of coarse and fine aggregates and cement and intermingling said ingredients comprising; a plurality of storage hoppers each constituting a pair of bins adapted respectively to contain a quantity of segregated aggregates, said bins each having a discharge opening, a plurality of feeding devices, one for each pair of bins, said discharge openings arranged to cause a predetermined quantity of aggregates from each pair of bins to be fed to said common feeding device, a common aggregate weighing hopper, said feeding devices extending from said discharge openings to said aggregate weighing hopper, means for regulating the operation of said feeding devices to cause the same to convey a predetermined charge of the respective aggregates sequentially to said hopper, an individual cement weighing hopper, means for feeding a predetermined charge of cement into said hopper, a mixing hopper, said cement and aggregate hopper disposed above said mixing hopper on opposite sides thereof, a discharge door for each of said hoppers, and actuating means common to both hoppers adapted to discharge said hoppers simultaneously into said mixing hopper for intermingling the ingredients of each hopper.

3. In an apparatus for weighing individual charges of ingredients and intermingling the same, a plurality of storage hoppers, each constituting a pair of bins adapted to contain separate ingredients, said bins each having a discharge opening, a respective feeding device common to each pair of bins, respective power units for actuating said feeding devices, a weighing hopper common to all of said bins, control means interconnecting said weighing hopper with said feeding devices to cause each feeding device to convey a predetermined charge of each ingredient to said hopper, a mixing hopper, and control means operable to discharge said weighing hopper into said mixing hopper for intermingling the ingredients of said hopper.

4. In an apparatus for mixing a predetermined quantity of coarse and fine aggregates and cement to provide a dry concrete mix, the combination of; a mixing unit, a plurality of mixing baffles disposed within said mixing unit, said baffles having separators therebetween to divide the aggregate into a series of individual streams, each of said baffles having a differential pitch to cause a differential rate of flow for each individual stream of aggregates, and a cement deflector plate disposed at an angle intersecting the angle of said aggregate baffles and spaced therefrom, said deflector plate adapted to receive a charge of cement and adapted to intercept the individual streams of aggregates sequentially to intermingle the same with the cement flowing down said cement deflector plate.

ARTHUR C. AVRIL.

REFERENCES CITED

The following references are of record in the file of this patent:

UNITED STATES PATENTS

| Number | Name | Date |
|---|---|---|
| 694,575 | Ransome | Mar. 4, 1902 |
| 808,599 | Crichfield | Dec. 26, 1905 |
| 1,828,458 | Butler | Oct. 20, 1931 |
| 2,179,485 | Avril | Nov. 14, 1939 |